US009533535B2

(12) United States Patent
Akesson et al.

(10) Patent No.: US 9,533,535 B2
(45) Date of Patent: Jan. 3, 2017

(54) DRIVE UNIT FOR A RAIL-ROAD VEHICLE

(71) Applicant: CeDe Group AB, Malmö (SE)

(72) Inventors: Jan-Ake Akesson, Lund (SE); Mats Kristerson, Vollsjö (SE); Rickard Andersson, Eslöv (SE); Niclas Henriksson, Billinge (SE)

(73) Assignee: CeDE Group AB, Malmö (SE)

( * ) Notice: Subject to any disclaimer, the term of this patent is extended or adjusted under 35 U.S.C. 154(b) by 110 days.

(21) Appl. No.: 14/399,481

(22) PCT Filed: May 7, 2013

(86) PCT No.: PCT/EP2013/059493
§ 371 (c)(1),
(2) Date: Nov. 6, 2014

(87) PCT Pub. No.: WO2013/167595
PCT Pub. Date: Nov. 14, 2013

(65) Prior Publication Data
US 2015/0158358 A1 Jun. 11, 2015

(30) Foreign Application Priority Data
May 8, 2012 (SE) ...................................... 1250467

(51) Int. Cl.
*B60F 1/04* (2006.01)
*B61D 15/00* (2006.01)
*E02F 9/02* (2006.01)

(52) U.S. Cl.
CPC ............... *B60F 1/043* (2013.01); *B61D 15/00* (2013.01); *E02F 9/022* (2013.01); *E02F 9/024* (2013.01); *B60F 2301/04* (2013.01)

(58) Field of Classification Search
CPC ..... B60K 17/356; B60K 17/10; B60K 28/165; B60K 28/16; B60K 17/14; B60F 1/043; B60F 1/04; B60F 1/005; B60F 1/02; B60F 2301/04; B60F 2301/00; B60F 2301/02; B61D 15/00; E02F 9/024; E02F 9/02; E02F 9/022; F16H 61/456; F16H 61/4157; F16H 61/423; F16H 61/452
See application file for complete search history.

(56) References Cited

U.S. PATENT DOCUMENTS 2,657,947 A * 11/1953 Kerner ...................... B60F 1/02 295/8.5
4,503,928 A 3/1985 Mallen-Herrero et al.
(Continued)

FOREIGN PATENT DOCUMENTS

| | | |
|---|---|---|
| DE | 3914953 | 11/1990 |
| DE | 202004010836 | 9/2004 |

(Continued)

OTHER PUBLICATIONS

Fixed and Variable-Displacement Motors, Machine Design, Oct. 26, 2006.*

*Primary Examiner* — Mark Le
(74) *Attorney, Agent, or Firm* — Lowe Graham Jones PLLC

(57) ABSTRACT

A drive unit for a road-rail vehicle having at least four wheels, for movement on rails, wherein each wheel is driven by a separate hydraulic motor. Further the hydraulic motors driving the wheels situated on one side of a longitudinal central axis of the vehicle are connected in parallel.

9 Claims, 5 Drawing Sheets

(56) References Cited

U.S. PATENT DOCUMENTS

| | | | | |
|---|---|---|---|---|
| 4,534,297 | A * | 8/1985 | Johnson, Sr. | B60F 1/043 105/215.2 |
| 6,135,231 | A * | 10/2000 | Reed | B62D 9/00 180/307 |
| 7,017,703 | B2 * | 3/2006 | Smalley | F16D 31/00 180/308 |
| 8,185,279 | B2 * | 5/2012 | Ryyppo | B60K 17/10 180/305 |
| 2003/0172837 | A1 | 9/2003 | Whiston et al. | |
| 2009/0078480 | A1 | 3/2009 | Liberty et al. | |
| 2009/0192674 | A1 * | 7/2009 | Simons | B60G 17/018 701/37 |

FOREIGN PATENT DOCUMENTS

| | | |
|---|---|---|
| DE | 102005002407 | 2/2006 |
| EP | 0847882 | 6/1998 |

* cited by examiner

DRIVE UNIT FOR A RAIL-ROAD VEHICLE

PRIORITY CLAIM

This invention claims priority from PCT Application Serial No. PCT/EP2013/059493 filed May 7, 2013, which claims priority to Swedish Application Serial No. 1250467-6 filed May 8, 2012, which is hereby incorporated by reference.

TECHNICAL FIELD

The present invention relates to a road-rail vehicle or a two-way vehicle for construction or maintenance work along a railway.

BACKGROUND

Vehicles which may be rail bound, road bound or both may perform construction or maintenance work along a railway are known today. Often the vehicles include at least four wheels for rail transportation and some sort of hydraulic driving unit.

DE-A1-102005002407 describes such a vehicle, with four wheels and at least one hydraulic motor. it also describes that the hydraulic motor connected to a wheel is connected in series to an other hydraulic motor connected to the other wheel of the same side so that the front wheel and the rear wheel of the left side is connected together by their hydraulic motors. One drawback with this execution is that when the user does construction or maintenance work on the side of the rail while moving the vehicle forward or backward the wheels may start to slip, whereby the traction force decreases. The vehicle has a bad differential effect which affects the wheels of the vehicle when e.g. the vehicle perform work along the side of the rail while driving in curves.

SUMMARY

It is an object to the present invention to provide an improved vehicle which solves or mitigates the above-mentioned problems.

A particular object of the present invention is therefore to provide a system for a road-rail vehicle which prevents the wheel of the vehicle from slipping. These and other objects, which will appear from the following description, have now been achieved by a drive unit for a road-rail vehicle having at least four wheels for movement on rails, whereby each wheel is driven by a separate hydraulic motor, Further the hydraulic motors driving the wheels situated on one side of a longitudinal central axis of the vehicle are connected in parallel enabling the vehicle to move forward and backward also when the position of the center of mass of said vehicle varies.

Such a drive unit allows the vehicle to perform light and heavy construction as well as maintenance work along a railway while moving forward or backwards. The parallel connection makes it possible to apply the force from the motors of the vehicle on the wheels situated on the same side depending on the location of the center of mass of the vehicle. Thus, the right amount of force, depending on the location of the center of mass, may be applied to the wheels so that the risk of wheel slip is mitigated. Also, the drive unit contributes to an improved differential effect when e.g. driving in curves.

In one embodiment the hydraulic motors on each sides of the vehicle are connected in one separate hydraulic circuit. This provides for controlling the force to be applied to each wheel even more accurately.

In another embodiment the hydraulic motors have variable displacement. This is an advantageous feature when controlling the braking effect and it gives the driver the opportunity to adjust between vigorous and soft braking.

Such a vehicle allows efficient construction or maintenance work as the drive unit provide a system which distribute the force to the right wheels so that the vehicle may move unopposed and without the wheels slipping on the rails.

Further objects and advantages of the present invention will be obvious to a person skilled in the art reading the detailed description below of embodiments.

BRIEF DESPRIPTION OF THE DRAWING

Embodiments of the present invention will be described in the following references being made to the appended drawings, wherein.

DETAILED DESCRIPTION OF THE EMBODIMENTS

Figure 1:
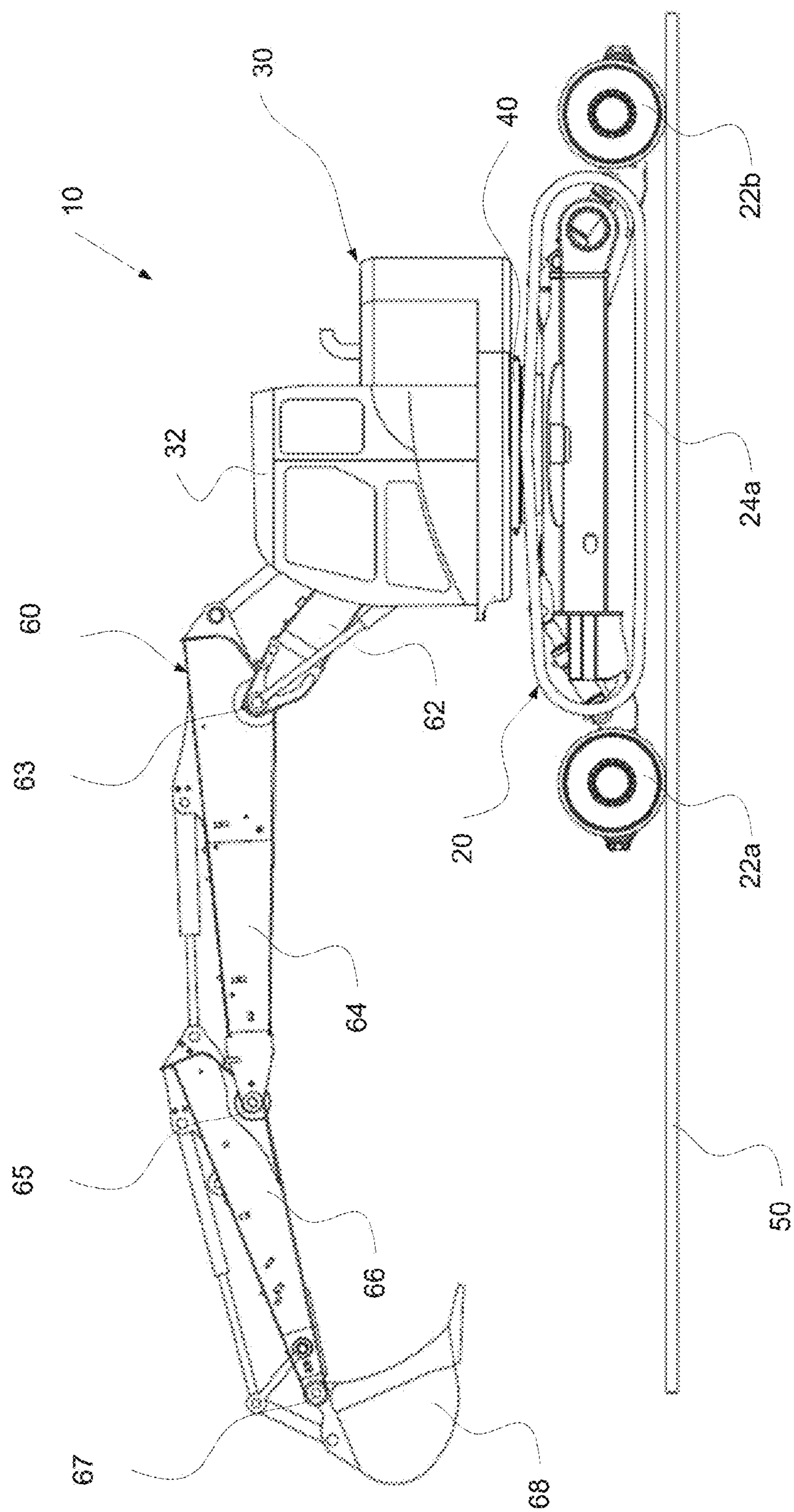
FIG. 1 shows a side view of a vehicle in a first state.

Starting with FIG. 1 a road-rail vehicle 10 is shown. The vehicle consists of a lower part 20 and an upper part 30 wherein the upper part 30 is pivotally connected to the lower part 20 by means of a turntable 40. The upper part 30 may rotate freely, at least 360° in relation to the lower part 20. Normally different parts of a hydraulic system are placed in the lower part 20 and the upper part 30 of the vehicle 10, whereby a swivel is arranged for connection between the upper part 30 and the lower part 20.

The vehicle 110 as shown has two different means of transportation. The lower part 20 includes at least four wheels 22*a*, 22*b*, 22*c*, 22*d* suitable for driving on rails 50, and two crawlers 24*a*, 24*b* for driving outside the rails 50. When the vehicle 10 is to be driven on rails 50 it is positioned with the wheels 22*a*, 22*b*, 22*c*, 22*d* above the rails 50. The wheels 22*a*, 22*b*, 22*c*, 22*d* are then lowered on to the rails 50 until the crawlers 24*a*, 24*b* are lifted from the ground. Of the four wheels 22*a*, 22*b*, 22*c*, 22*d* of the vehicle two wheels are situated on each side of the vehicle 10. One crawler 24 is situated on each side of the vehicle 10. FIG. 1 shows the vehicle 10 in a state where it runs on the rails 50 by means of the wheels 22*a*, 22*b*, 22*c*, 22*d* and where the crawlers 24*a*, 24*b* are lifted above the ground level so that they are not in contact with the ground or the rails 50. The wheels 22*a*, 22*b*, 22*c* 22*d* are placed in front of and behind the crawlers 24*a*, 24*b* but with a smaller gauge, which means that the vehicle 10 will be more sensitive to loads at one side when on the wheels 22*a*, 22*b*, 22*c*, 22*d* than when on the crawlers 24*a*, 24*b*.

Even though the vehicle is shown with two crawlers 24*a*, 24*b* for driving outside the rails, a person skilled in the art realizes that in other embodiments the crawlers may be replaced by four or more wheels. Also the number of wheels for driving on the rails may be more than four.

The upper part 30 includes a driver cabin 32 where the driver may sit and maneuver the vehicle 10. In an alternative embodiment, the vehicle has no driver cabin but is guided by a remote control of any kind. In one such embodiment the vehicle does not need to have an upper part, only a lower part 20. Further the upper part 30 includes a working arm 60 which is connected to one side of the cabin 32. The arm 60 consists of three parts wherein the first part 62 is connected to the cabin 32, the second part 64 is connected to the first part 62 and a third part 66 and wherein all parts 62, 64, 66 are connected by rotatable connections 63, 65, 67 to each other. At one end of the third part 66 an attachment 68 is rotatable connected. The attachment 68 may be a digger bucket, a hook assembly, a drill or any other tool used during construction and/or maintenance work, in another embodiment the arm 60 may have another appearance including one or more parts.

Figure 2:
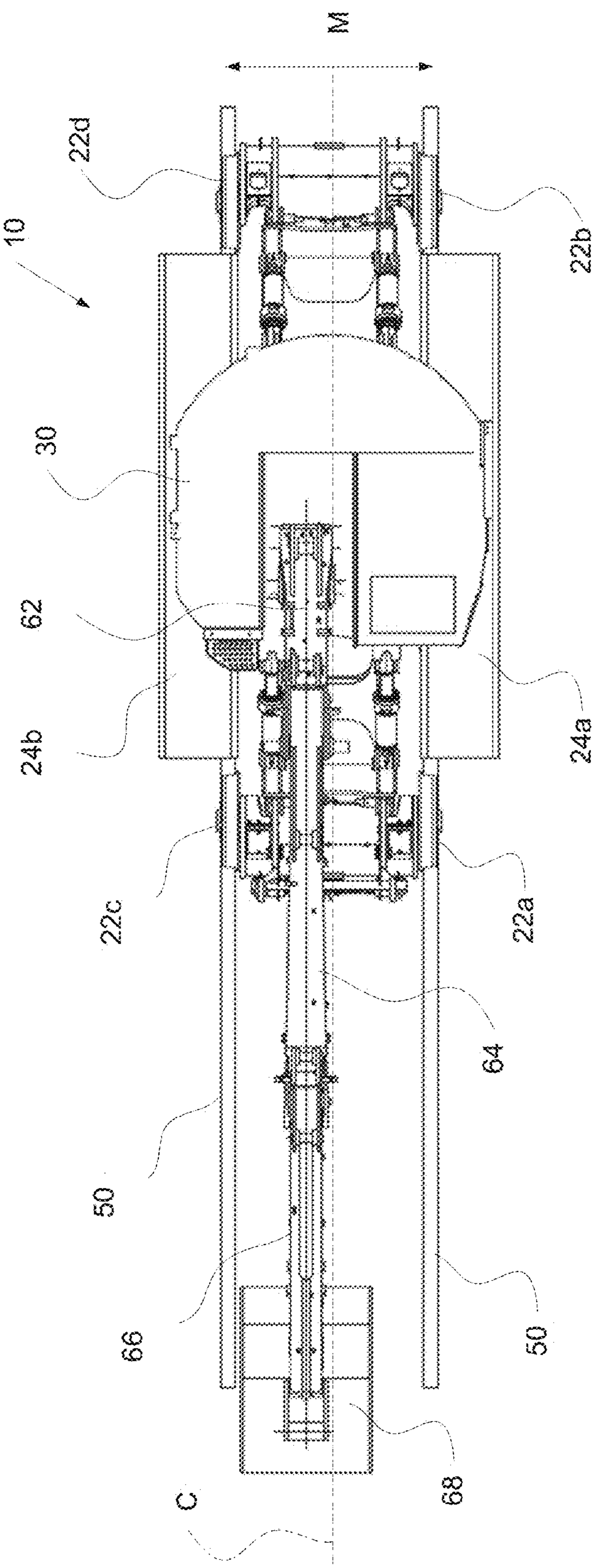
FIG. 2 shows a op view of the vehicle in FIG. 1

FIG. 1 and FIG. 2 show the vehicle 10 in a first state where the upper part 30 and the arm 60 are located in the direction of the rails 50 so that the center of mass M is located in between the two rails 50. The line C indicates a longitudinal central axis of the vehicle 10. The double arrow at M indicates the range the center of mass is allowed to move. If the centre of mass M moves outside of the indicated range the vehicle 10 will turn over.

Figure 3:
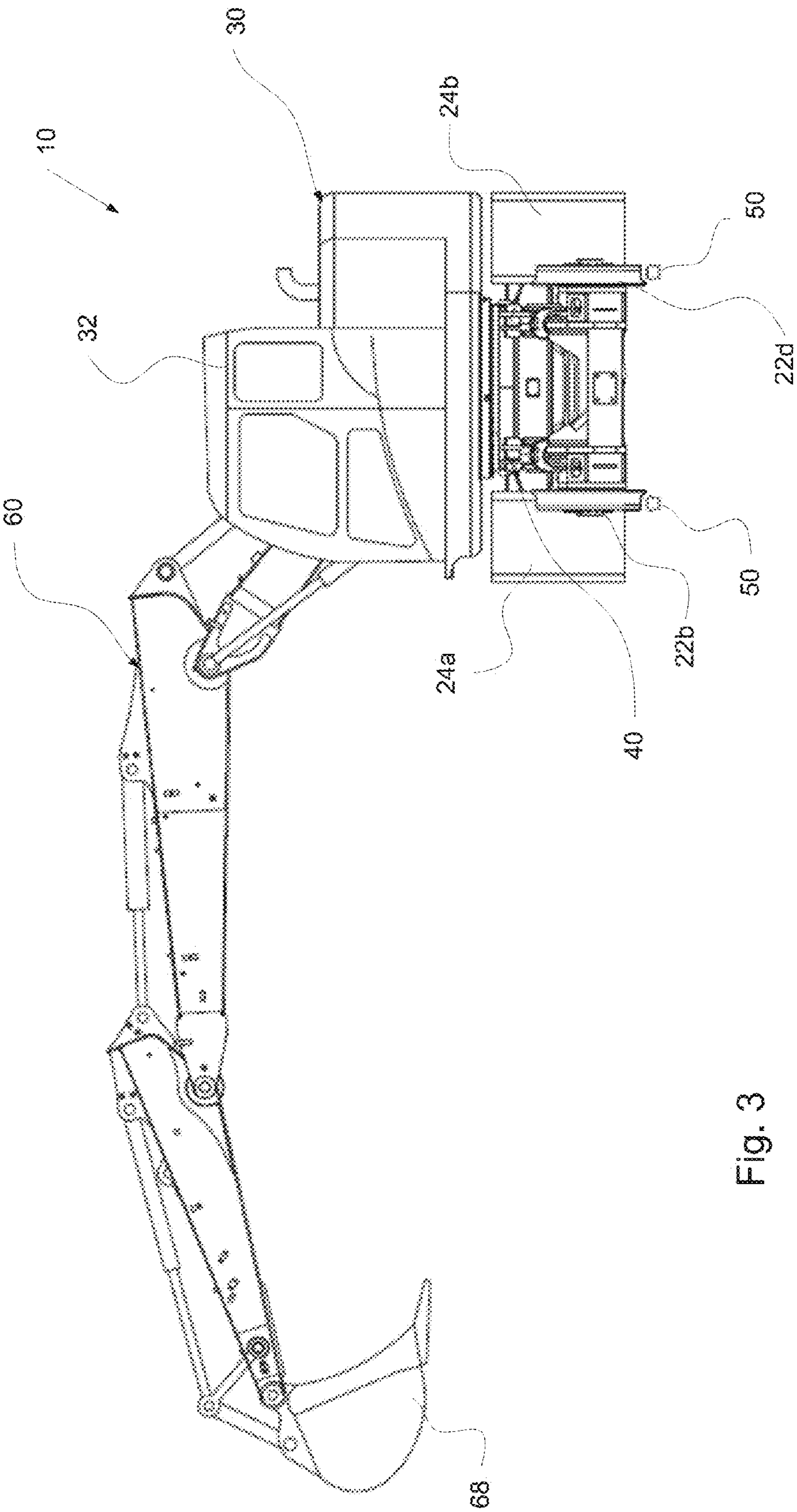
FIG. 3 shows a front view of the vehicle in a second state.
Figure 4:
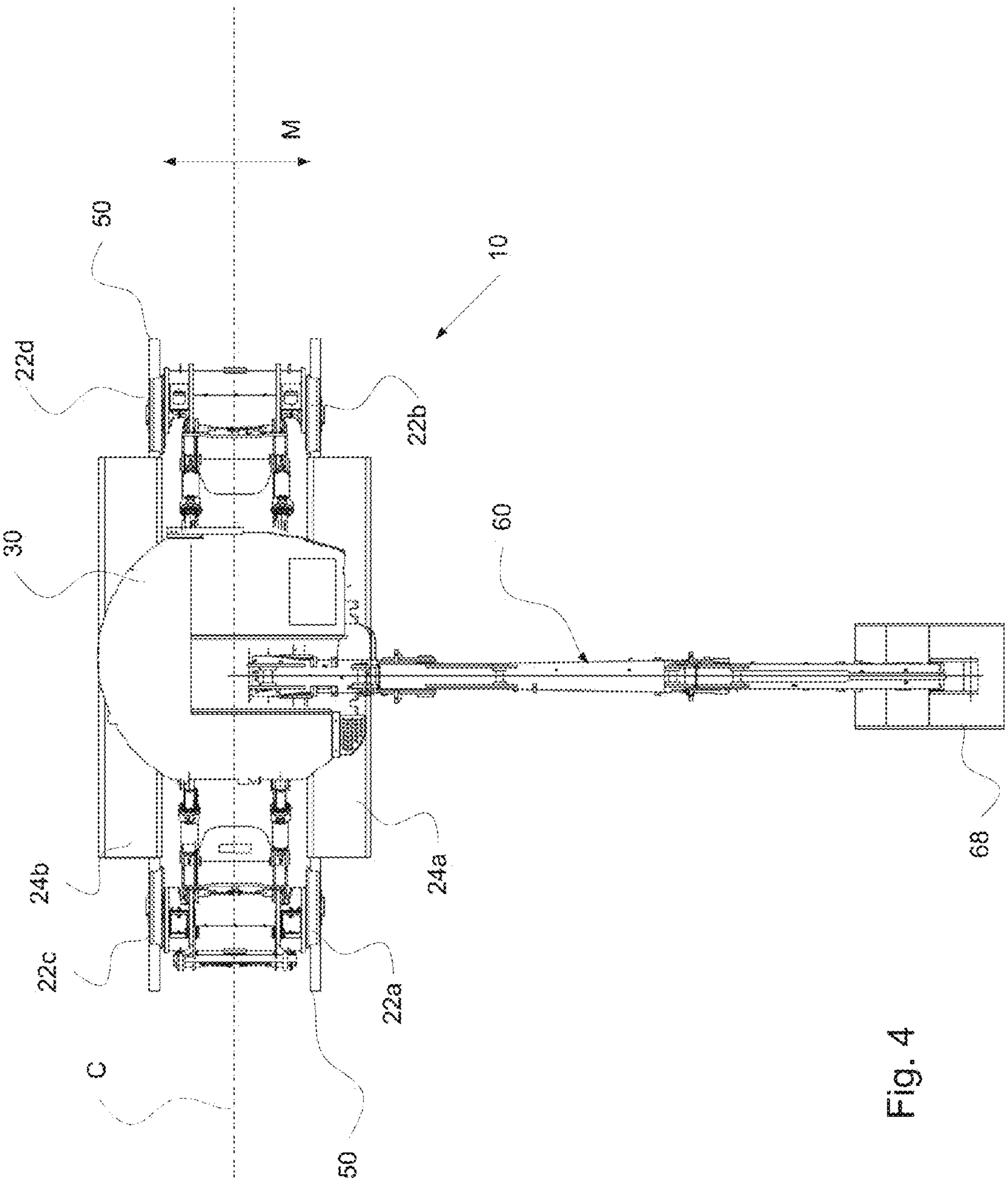
FIG. 4 shows a top view of the vehicle in FIG. 3.

FIGS. 3 and 4 show the vehicle 10 in a second state where the upper part 30 and the arm 60 with the attachment 68 have been rotated about 90° in relation to the lower part 20. Since the upper part 30 and the arm 60 have been rotated the center of mass M may now be located at another point and the position of said point depends on possible load in the attachment 68. Often when the vehicle 10 is performing construction or maintenance work along the rails 50, the vehicle 10 is at the same time moving forward or backwards. If the vehicle 10 is in the second state, shown in FIGS. 3 and 4, while moving forward or backwards, there will be a much higher weight pressing on the wheels 22*a*, 22*b* which are located on the same side as the present position of the arm 60 when a load (not shown) is applied to the attachment 68 than on the wheels 22*c*, 22*d* on the opposite side. On the other hand, if there is no load applied to the attachment 68 and the vehicle 10 is in its second state, the center of mass NI is more likely located near the wheels 22*c*, 22*d* on the opposite side of the arm 60. The location of the center of mass M varies greatly depending on the angle of the arm 60 and the weight applied to the arrangement 68. Therefor it is an important feature of the vehicle 10 to vary the force tier movement applied to the wheels 22*a*, 22*b*, 22*c*, 22*d* depending on the position of the center of mass M, i.e. the amount of pressure applied on the wheels 22*a*, 22*b*, 22*c*, 22*d* of each side of the vehicle 110. To achieve this advantageous feature the vehicle 10 is provided with a drive unit 100, shown in FIG. 5 that will decrease the risk of wheels slipping and improve the efficiency of the force put into the hydraulic system and so that the traction force of the vehicle increases.

Figure 5:
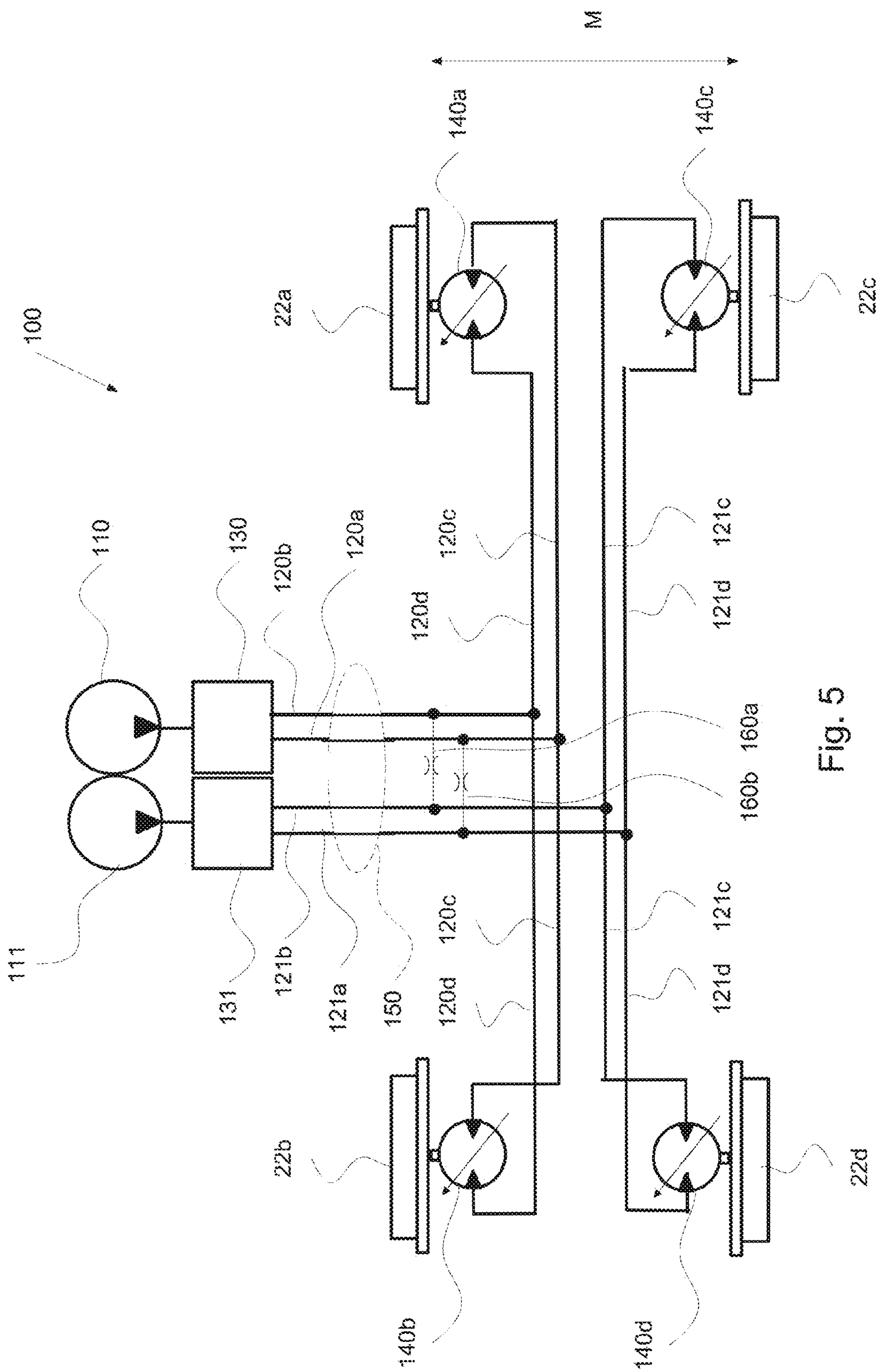
FIG. 5 shows a schematic scheme of a hydraulic drive system used in the vehicle.

FIG. 5 shows a simplified schedule of the drive unit 100 used in the vehicle 10 comprising two hydraulic pumps 110, 111. In the shown embodiment the drive unit 100 is divided into two separate, identical hydraulic circuits. Normally one hydraulic pump is placed in each separate hydraulic circuit, but in some embodiments a common hydraulic pump is used for both hydraulic circuits and in sonic embodiments more than one hydraulic pump is used for each hydraulic circuit. The boxes 130, 131 in front of respective hydraulic pump 110, 111 represents valves used to connect the pump flow either to a line for driving the vehicle 10 forward or a line for driving the vehicle 10 backward. In the schematic scheme of FIG. 5 some parts are omitted, such as a tank, filters and possible further valves. Each hydraulic circuit drives one side of a longitudinal axis C of the vehicle 10 and comprises the same elements. Hence, one hydraulic circuit is presented where the hydraulic flow of the pump 110 is directed either to a first line 120*a* or a second line 120*b* by means of the valves of the box 130. The line not receiving the flow of the pump 110 will receive a return flow. Each line 120*a*, 120*b* is connected to a third and/or fourth line 120*c*, 120*d*, which leads to opposite sides of two hydraulic motors 140*a*, 140*b*. Each hydraulic motor 140*a*, 140*b* is drivingly connected to a wheel 22*a*, 22*b*, preferably a front wheel and a rear wheel of the vehicle 10. The hydraulic motors 140*a*, 140*b* are connected in parallel to each other and are shown as having variable displacement, but it is also possible to use hydraulic motors having a fixed displacement. Also if there are more than two wheels on each side of the vehicle 10 each wheel will be driven by a separate hydraulic motor and all hydraulic motors will be connected in parallel to each other.

The other hydraulic circuit has the same elements and appearance as the described hydraulic circuit but drives the other side of the longitudinal axis C of the vehicle 10. The pumps 110, 111 and the set of valves 130, 131 are located in the upper part 30 of the vehicle 10 and the hydraulic motors 140*a*, 140*b*, 141*a*, 141*b* are located in the lower part 20 of the vehicle 10. The flow lines 120*a*, 120*b*, 121*a*, 121*b* are partly located within a swivel 150 to transfer hydraulic flow and so that the upper part 30 may rotate freely in relation to the lower part 20.

By means of the separate hydraulic circuits the hydraulic motors 140*a*, 140*b*, 140*c*, 140*d* on either side of the vehicle 10 may be driven depending on the actual effect needed at respective side of the vehicle 10. Thereby, the vehicle 10 may carry a larger load and still be able to move. If the hydraulic motors 140*a*, 140*b*, 140*c*, 140*d* are given the same pressure or effect the wheels will start slipping at a smaller load.

Between the flow line 120*a* and flow line 121*a*, respective flow line 120*b* and flow line 121*b* a restriction 160*a*, 160*b* is connected. This restriction 160*a*, 160*b* is optional but is advantageous when a balanced differential effect is desired, for instance when driving in curves. The same differential effect may on the other hand be achieved without the restrictions 160*a*, 160*b* since the drive system of the vehicle 10 allows the driver to manually control this feature.

The drive unit 100 is controlled by a signal processing unit (not shown) that may be electronic, hydraulic etc.

Hydraulic motors having a variable displacement may be used to control the braking effect at transport on the rails. To have a good braking effect the hydraulic motor should have a high displacement. If the hydraulic motor is placed in a low displacement mode the torque out of the motor will be low, which will give both a low hydrostatic braking torque and hence a long braking distance. The different braking effects at high and low displacement of the hydraulic motors are used in the following way. When preselecting automatic displacement shifting and partly activating the controls, which may be a lever, the motors will start in high displacement. When increasing the activation of the controls, the motors will shift to low displacement which will result in increasing the speed of the vehicle. When moving the controls towards neutral position, the motors will shift from low to high displacement at a certain position of the control, this will lead to increasing brake force which will result in a reduced stopping distance. The position of the driving controls may be registered either by a pilot pressure, by sensing the actual position of the controls or by any other suitable signal.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. in addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A vehicle for construction and maintenance work along a railway, the vehicle comprising:

a lower part and an upper part which is rotatable in relation to the lower part and which comprises a working arm, the lower part including at least four rail-contact wheels configured to be in driving contact with rails, and at least one of crawlers and ground-contact wheels configured to be in driving contact with the ground outside the rails, the vehicle having first and second states of operation, the first state being with the rail-contact wheels in driving contact with the rails and the at least one of the crawlers and the ground-contact wheels out of contact with the ground, and the second state being with the rail-contact wheels out of contact with the rails and the at least one of the crawlers and the ground-contact wheels in driving contact with the ground;

each drivingly connected to one of the rail-contact wheels for movement on the rails;

wherein the hydraulic motors drivingly connected to the rail-contact wheels situated on one side of a longitudinal central axis of the vehicle are connected in parallel via a pair of lines that have ends connected to the hydraulic motors on the one side of the longitudinal central axis, for enabling the vehicle to move forward and backward;

wherein the hydraulic motors on each side of the longitudinal central axis of the vehicle are connected in separate hydraulic circuit; and wherein each separate hydraulic circuit comprises a separate hydraulic pump.

2. The vehicle of claim 1, wherein a common hydraulic pump is used for the separate hydraulic circuits on respective sides of the vehicle.

3. The vehicle of claim 1, wherein the separate hydraulic circuits are controlled independently of each other.

4. The vehicle of claim 1, wherein a flow of the pump in each separate hydraulic circuit of the separate hydraulic circuits is directed to a first line connected to one side of a respective hydraulic motor of the at least four separate hydraulic motors for driving the vehicle in one direction and a second line connected to an other side of the respective hydraulic motor for driving the vehicle in an opposite direction.

5. The vehicle of claim 4, wherein flow restrictions are placed in lines connecting first and second lines of the separate hydraulic circuits for driving the vehicle in different directions.

6. The vehicle of claim 1, wherein the hydraulic motors have variable displacement.

7. The vehicle of claim 6, wherein the hydraulic motors are configured to have a first mode with a first displacement to give a braking of a first force and a second mode with a second displacement to give a braking with a second force, and wherein the first displacement is higher than the second displacement and the first braking force is more vigorous than the second braking force.

8. The vehicle of claim 7, wherein means are arranged to shift the hydraulic motors between modes of high and low displacement depending on a position of a driving lever.

9. The vehicle of claim 1, wherein the hydraulic motors have fixed displacement.

* * * * *

UNITED STATES PATENT AND TRADEMARK OFFICE
CERTIFICATE OF CORRECTION

PATENT NO. : 9,533,535 B2
APPLICATION NO. : 14/399481
DATED : January 3, 2017
INVENTOR(S) : Akesson et al.

It is certified that error appears in the above-identified patent and that said Letters Patent is hereby corrected as shown below:

In the Claims

In Column 5, in Claim 1, insert -- wherein the vehicle comprises a drive unit having at least four separate hydraulic motors -- before Line 42 “each drivingly connected to ...”

Signed and Sealed this
Fourth Day of April, 2017

Michelle K. Lee
*Director of the United States Patent and Trademark Office*